United States Patent [19]

Herron

[11] Patent Number: 4,506,898
[45] Date of Patent: Mar. 26, 1985

[54] DRIFT ELIMINATOR FOR SERIES HYDRAULIC LIFT SYSTEM ON TILLAGE IMPLEMENTS AND THE LIKE

[75] Inventor: Maynard M. Herron, Hesston, Kans.

[73] Assignee: Hesston Corporation, Hesston, Kans.

[21] Appl. No.: 576,146

[22] Filed: Feb. 2, 1984

[51] Int. Cl.³ .............. F15B 11/16; F15B 13/06; F15B 15/24
[52] U.S. Cl. .............. 280/43.23; 91/189 R; 91/404; 91/520; 172/401
[58] Field of Search .............. 91/410, 404, 189 R, 91/520, 171; 280/43.23; 172/310, 311, 400, 401

[56] References Cited

U.S. PATENT DOCUMENTS

| | | | |
|---|---|---|---|
| 3,476,016 | 11/1969 | Dixon et al. | 91/520 |
| 3,667,347 | 6/1972 | Patrick | 91/404 |
| 3,972,265 | 8/1976 | Magnuson | 91/404 |
| 4,241,641 | 12/1980 | Reinert | 91/520 |
| 4,324,296 | 4/1982 | Schenk et al. | 172/311 |
| 4,409,884 | 10/1983 | Boehringer | 91/520 |

*Primary Examiner*—Paul E. Maslousky
*Attorney, Agent, or Firm*—Schmidt, Johnson, Hovey & Williams

[57] ABSTRACT

The double-acting hydraulic cylinders of the lift system are connected in a master-slave series relationship. When the cylinders have been retracted to a predetermined extent, a control valve between the last slave and a primary selector valve of the system is mechanically closed responsive to the arrival of the cylinders at such retracted condition and, simultaneously, the master is prevented from further retraction by either mechanical means or another hydraulic control valve between the master and the primary selector valve. Thus, the cylinders and their interconnecting lines are cut off from inadvertent overcharging, as well as fluid escape, so that all cylinders remain uniformly extended with drift from their established positions. Several circuit arrangements are disclosed, including provision for bleeding off higher than necessary operating pressures tending to become trapped within the cylinders and their associated flow lines after the cylinders have reached the intended point of retraction.

22 Claims, 9 Drawing Figures

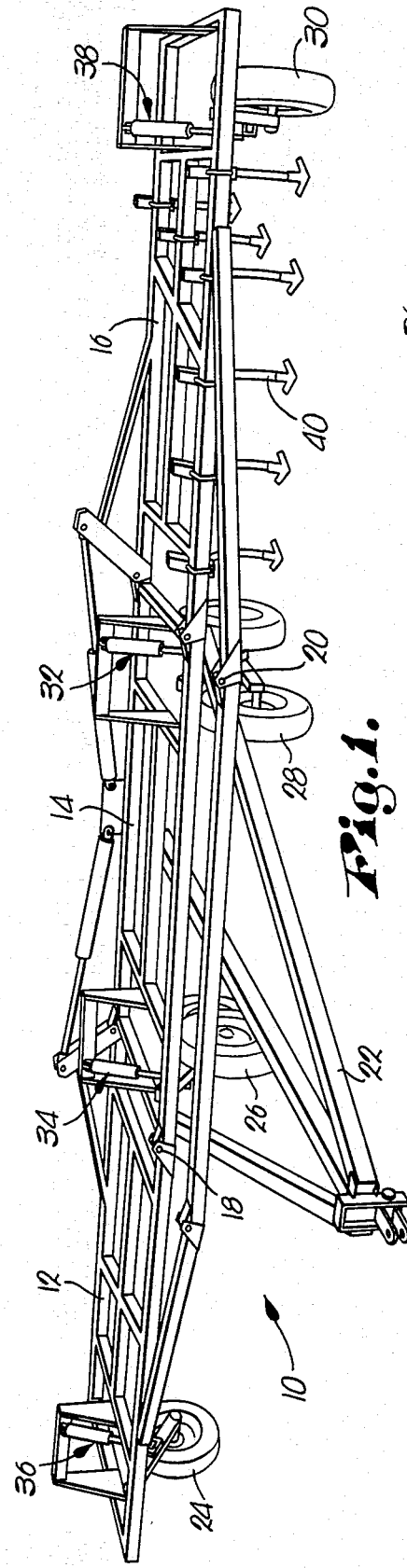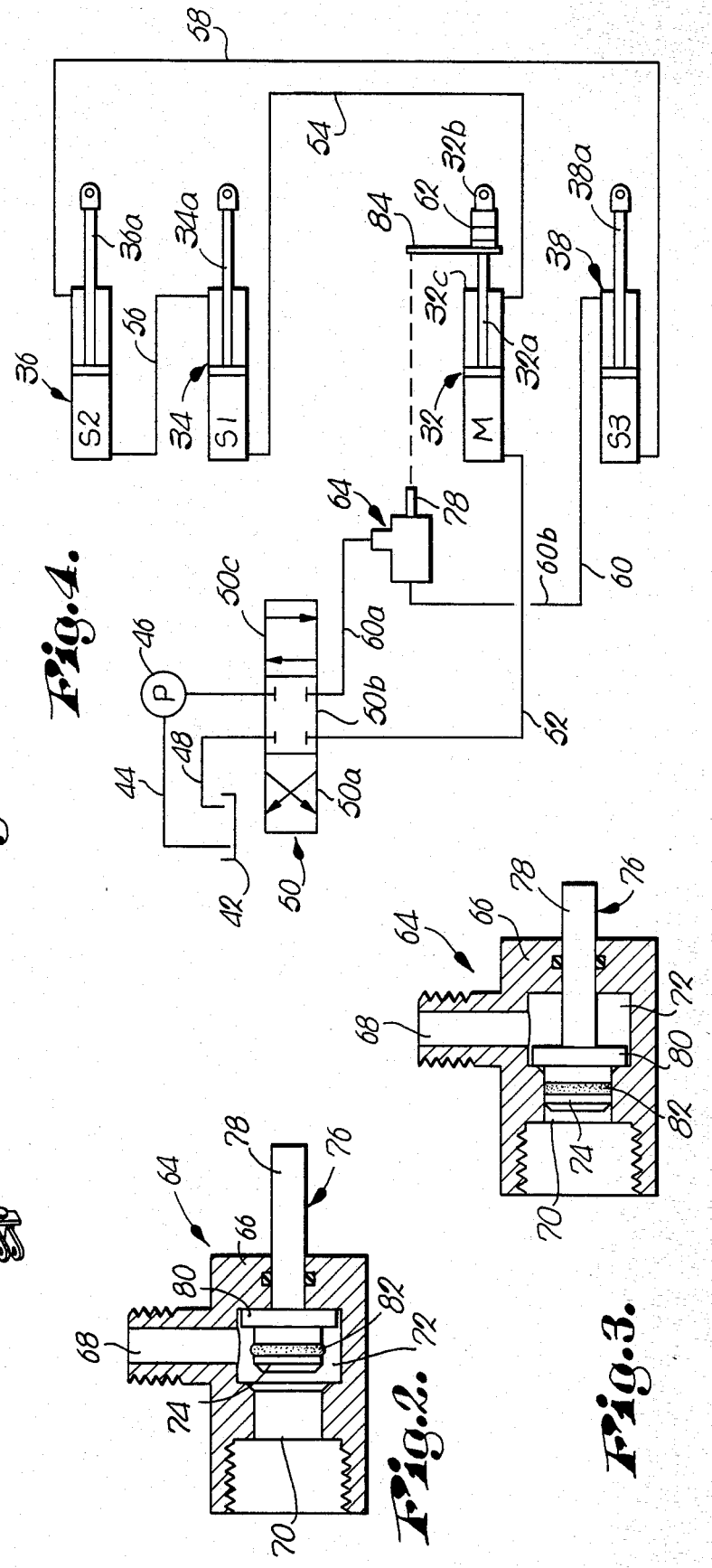

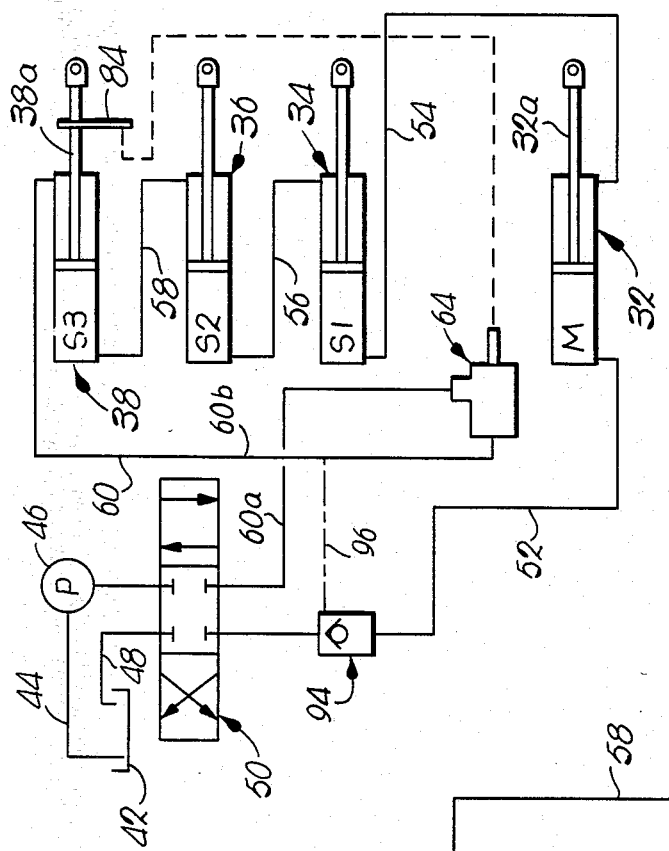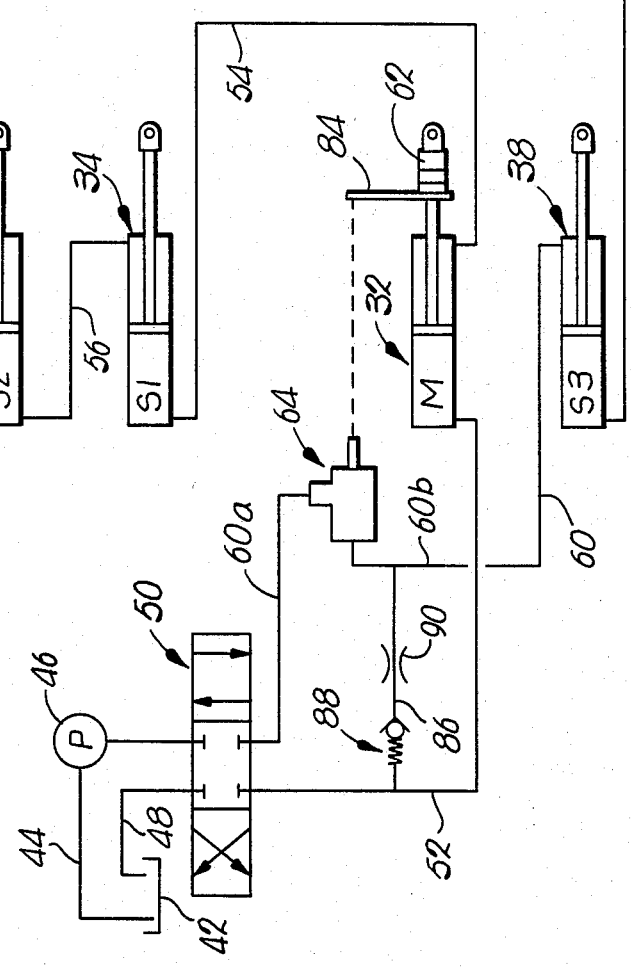

DRIFT ELIMINATOR FOR SERIES HYDRAULIC LIFT SYSTEM ON TILLAGE IMPLEMENTS AND THE LIKE

TECHNICAL FIELD

This invention relates to the field of hydraulic power systems and is especially suitable for use in connection with land vehicles such as tillage implements in which the depth of penetration of ground working tools associated with such implements is controlled by hydraulically raising or lowering the frame or chassis of the implements relative to the ground.

BACKGROUND

Although theoretically hydraulic cylinders which are connected in a series-flow relationship and are matched with respect to fluid capacities operate simultaneously and in equal amounts when subjected to pressurized fluid, it has been found that in some situations such ideal operation is not obtained and, in fact, one or more cylinders in the series may drift out of its intended position. For example, where such a system is utilized on a tillage implement to control working depth of tools associated with the implement by raising and lowering the frame relative to the ground, it has been noted that even though the master cylinder in the series may stop at its intended location such that proper depth of operation is achieved at that portion of the frame, other cylinders in the series which are slaved to the master may have a tendency to drift away from the depth thought to be established by the master. It is believed that such drift is caused at least in part by factors such as expansibility of hoses used in the hydraulic circuit; compressibility, though slight, of the hydraulic fluid; differences in pressures experienced in the system when operating at high flow rates as compared to lower flow rates; temperature and viscosity of the fluid; leakage of the primary tractor control valve; and the manner in which the tractor valve is actually manipulated by the operator, e.g., whether or not the valve is held in an open position for a certain amount of time beyond that which is actually necessary for the implement to reach its selected depth of operation.

SUMMARY OF THE PRESENT INVENTION

Accordingly, one important object of the present invention is to provide a substantial solution to the drift problem without adding separate depth control stops or the like to each individual cylinder, which would be a decided inconvenience compared to the present common practice of using such stops at only one of the series-connected cylinders, e.g., the master.

In carrying out the foregoing object, the present invention contemplates inserting a control valve between the last slave in the series and the primary selector valve for the system. Such valve is normally open, but when the cylinders in the series reach a predetermined extent of actuation, the valve closes. Thus, even though the operator may thereafter inadvertently continue to hold the primary selector valve open as if to further charge the system, such additional charging cannot occur and the slave units in the system cannot become "overcharged" relative to the master which has been stopped in its actuation by other appropriate means such as mechanical stroke control collars or a hydraulic shut-off valve.

The invention also contemplates a special bleed line and relief valve arrangement which is provided to address the problem of drift due to high pressures that may be experienced during periods of high volume fluid flow. In this respect the bleed line and relief valve arrangement is operable to prevent the accumulation of such high pressures within the system once the predetermined extent of actuation of the cylinders has been reached, but without interfering with the imposition of such high pressures on the system during the times that they are needed, i.e., during relatively rapid extension and/or retraction of the hydraulic units such as during raising and lowering of the implement.

BRIEF DESCRIPTION OF THE DRAWINGS

FIG. 1 is a perspective view of a tillage implement employing a hydraulic lift control system constructed pursuant to the principles of the present invention;

FIG. 3 is a view of the control valve similar to FIG. 2 but with the valve illustrated in a closed position;

FIG. 4 is a schematic diagram of one version of lift system incorporating the principles of the present invention;

FIG. 5 is another schematic diagram illustrating a second embodiment of the present invention;

FIG. 7 is a schematic diagram of a fourth embodiment of the present invention;

FIG. 8 is a schematic diagram of a fifth embodiment of the present invention.

DETAILED DESCRIPTION

Figure 2:
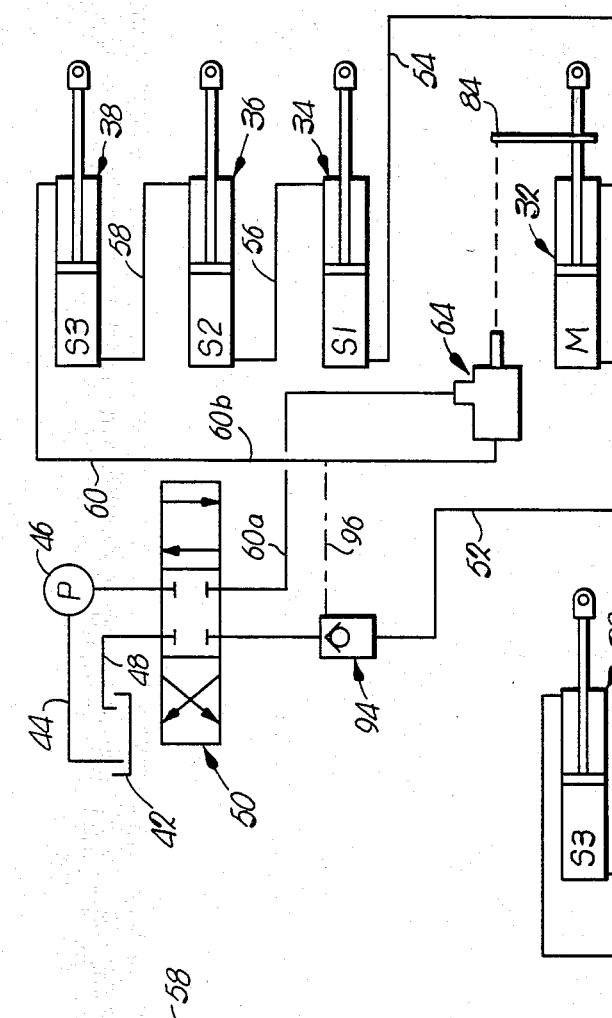
FIG. 2 is an enlarged, cross-sectional view of a flow control valve between the last slave and the primary selector valve normally found on a tractor used for pulling an implement such as that shown in FIG. 1, the control valve being illustrated in its open position.

In order to best disclose the principles of the present invention, a tillage implement has been illustrated and will be described herein in connection with the invention. However, it is to be understood and will be appreciated that such use of the tillage implement is by way of example only, because the principles of the present invention have equal utility in a wide range of other structures and machines.

The tillage implement 10 illustrated in FIG. 1 comprises three primary frame sections 12, 14, and 16 interconnected by a pair of hinges broadly denoted by the numerals 18 and 20 so that the sections may flex relative to one another about fore-and-aft extending axes coinciding with the hinges 18 and 20. A tongue 22 extends forwardly from the center section 14 for connecting the implement 10 with a towing vehicle (not shown), and independent sets of ground wheels 24, 26, 28, and 30 support the frame sections 12, 14, and 16 for movement over the ground. The ground wheels 28 are swingably connected to the center section 14 for movement toward and away from the latter in a vertical direction by a master hydraulic cylinder 32 which is connected between the frame 14 and the wheels 28. Likewise, the wheels 26 are swingably connected to the center section 14 for movement toward and away from the latter in a vertical direction by a slave cylinder 34 connected between the frame section 14 and the wheels 26. The outboard wheel 24 is likewise swingably connected to the wing section 12 for vertical movement toward and away from the latter by another slave cylinder 36 extending between section 12 and wheel 24, while the other outboard wheel 30 is swingably connected to its wing section 16 for vertical movement toward and away from the latter by a third slave cylinder 38 connected between the wing section 16 and the wheel 30.

The master cylinder 32 and the slaves 34, 36, and 38 are double-acting, rephasing cylinders connected in a series hydraulic arrangement which, in its broad respects, is well known and understood by those skilled in the art. Further details of that realtionship will be subsequently described herein, but suffice it to point out for the moment that the cylinder units 32, 34, 36, and 38 are utilized to raise and lower the frame sections 12, 14, and 16 relative to the ground. Thus, they may be utilized to control the depth of ground penetration of tillage tools attached to and depending from the frame such as the tools 40 on the wing section 16. The fluid capacities of the cylinders 32, 34, 36, and 38 are matched in such a manner that they provide substantially equal amounts of actuation when the system is subjected to hydraulic pressure. In the arrangement illustrated, the volume of the anchor end of one cylinder in the series, for example, is substantially equal in capacity to the rod end of the next cylinder in the series, and vice versa, although there are other arrangements well known to those skilled in the art for achieving such matching relationship and uniform length of stroke.

Embodiment of FIG. 4

Turning now to FIG. 4, it will be noted that the cylinders 32-38 are those illustrated in connection with one embodiment of the present invention. A reservoir 42 supplies fluid to the units 32-38 through a line 44 having a pump 46, and fluid may return to the reservoir 42 via a line 48. A selector valve 50 may be shifted between any one of three different positions in which either the section 50a, 50b, or 50c thereof is brought into communication with the lines 44 and 48. As illustrated in FIG. 4, the section 50b is in communication with the lines 44 and 48 so that fluid flow through the lines 44 and 48 to and from the remainder of the hydraulic circuit is blocked. This may be described as a neutral position of the selector valve 50. Typically, the reservoir 42, lines 44 and 48, pump 46, and selector valve 50 will be located on the tractor.

A line 52 leads from the valve 50 to the base end of the master cylinder 32, while a line 54 leads from the rod end of the master 32 to the base end of the first slave 34. Another line 56 connects the rod end of slave 34 with the base end of the slave 36, while a line 58 connects the rod end of the slave 36 with the base end of the slave 38. A line 60 connects the rod end of the slave 38 with the selector valve 50.

One or more mechanical depth stop collars 62 are provided on the rod 32a of the master 32 between the outermost attaching yoke 32b and the proximal end of the cylinder housing 32c for the purpose of limiting the extent of retraction of the rod 32a. The number of such collars 62 utilized is a matter of choice, and the construction of such collars is well known and understood by those skilled in the art. Certainly, other suitable mechanical devices for limiting the extent of retraction of the rod 32a may be utilized as well.

A control valve 64, details of which are disclosed in FIGS. 2 and 3, is inserted into the line 60 between the third slave 38 and the selector valve 50. Such valve 64 is provided with a hollow body 66 having a pair of transversely intersecting bores 68 and 70 coupled in flow communication with the valve 50 and the slave 38 via opposite end portions 60a and 60b respectively of the hydraulic line 60. The bores 68 and 70 intersect in a chamber 72 which houses the head 74 of a valve member broadly denoted by the numeral 76 which is used to open or close the valve 64. A stem 78 of the valve member 76 projects from the enlarged head 74 through the proximal end of the valve body 66 and is telescopically retained by the latter so that member 76 may reciprocate between the open position of FIG. 2 and the closed position of FIG. 3. When the member 76 is in its closed position, a collar 80 thereof behind the head 74 flatly abuts the end wall portion of the chamber 72 adjacent the bore 70 so as to close off the latter, while the head 74 itself protrudes into the bore 70 and makes sealing engagement with the periphery thereof through a resilient O-ring 82.

The valve member 76 is adapted to be mechanically actuated when shifted from open to closed, while hydraulically actuated when shifted from closed to open. Such mechanical actuation may come from a variety of sources including, for example, structure associated with the frame of the implement or the vertically movable wheels 24-30. In the embodiment illustrated in FIG. 4, such actuating structure is associated with the master 32 and, for convenience, has been attached directly to the rod 32a thereof in the form of a cantilevered actuating component 84 adjustably disposed to engage the outermost end of the valve stem 78 just prior to the rod 32a becoming fully retracted to the extent permitted by the stop collars 62. Such initial engagement by the actuating component 84 is sufficient to shift the valve member 76 leftwardly a sufficient extent from the FIG. 2, open position thereof as to permit pressurized fluid to come behind the collar 80 and press against the back side thereof so as to thereupon complete shifting of the member 76 leftwardly to the closed position as illustrated in FIG. 3. Preferably, the actuating component 84 is resiliently flexible to such an extent that while it can physically shift the valve member 76 in the aforesaid manner, by the same token it can flex slightly in the opposite direction when the valve is to be reopened as will be subsequently described.

The hydraulic units 32-38 are connected between their wheels and the frame of the implement 10 in such a way that as the rods of the units extend, the frame is raised, whereas when they retract, the frame is lowered. Thus, when the selector valve 50 is shifted rightwardly from its neutral position of FIG. 4 so as to align the valve section 50a with hydraulic lines 44 and 48, line 44 is communicated with line 52 while line 48 is communicated with line 60. Consequently, and ignoring the valve 64 for the moment, it will be appreciated that the units 32-38 extend. On the other hand, when the selector valve 50 is shifted leftwardly from its neutral position in FIG. 4, line 48 is communicated with line 52 and line 44 is communicated with line 60. Consequently, oil if forced into the rod ends of the cylinder units 32-38, and they retract.

Such retraction of the cylinder units 32-38 continues until the stop collars 62 on the master 32 approach the proximal end of the cylinder housing 32c and the actuating component 84 comes into engagement with the valve stem 78. As the valve member 76 is shifted leftwardly from its FIG. 2 open position toward its FIG. 3 closed position by the actuating component 84, the head 74 of member 76 enters the bore 70 and begins to block the flow of fluid from bore 68 to bore 70, thus also from portion 60a of line 60 toward portion 60b of line 60. Fluid from the bore 68 comes behind the collar 80 at this time and, due to the pressure differential created between bore 68 and 70, causes the member 76 to snap closed completely as the collar 80 butts up against the end wall of chamber 72 adjacent the bore 70. At this time, the line 60 becomes completely closed to prevent further retraction of slave rod 38a and, likewise, the collars 62 prevent further retraction of the master 32. Thus, no more fluid may enter the rod end of the slave 38 at this time and, likewise, no cavitation may be caused to occur between the rod end the master 32 and the base end of slave 38 since the rod 32a of master 32 is held against any further retraction.

To raise the implement frame off the stop collars 62 associated with the master 32, the valve 64 must be reopened in order that fluid may leave the rod end of slave 38 and return to the reservoir 42 via lines 60 and 48. In this respect, as the selector valve 50 is shifted rightwardly from its neutral position of FIG. 4, the base end of the master 32 becomes subjected to line pressure from the pump 46, causing the pressure in the circuit downstream from the master 32 to likewise be increased, including that pressure existing in the portion 60b of line 60. Such pump pressure is applied against the head 82 of the valve member 76 tending to shift the latter rightwardly from its FIG. 3 closed position and causing the component 84 to yield slightly in a direction which permits the initial small-scale movement of the valve member 76. Such movement cracks open the valve 64 in the sense that bore 70 becomes communicated with bore 68. Once this occurs, the line 60 becomes reconnected to the reservoir 42 so as to permit additional fluid to be introduced to the circuit by the pump 46, further extending the rod 32a of master 32 and withdrawing the actuating component 84 from engagement with the stem 78 of valve member 76. Member 76 thus becomes snapped to its fully-opened position by the pressure of fluid flowing through the body 66 from bore 70 to the bore 68.

The provision of the special valve 64 between the rod end of the last slave 38 and the selector valve 50 is an effective way of preventing drift of the slaves 34, 36, and 38 relative to the master 32 since no additional fluid can be introduced into the rod ends of the slaves 34, 36, and 38 to further retract the same once the stop collars 62 have bottomed out against the housing 32c of master 32 and the valve 64 has been closed. Without the valve 64, it is possible that, even though the stop collars 62 have bottomed out against the housing 32c of master 32 so as to prevent further retraction of the latter, the operator might inadvertently continue to hold the selector valve 50 in its retract mode position, causing pressurized fluid to continue to be pumped into the rod ends of the slaves 34, 36 and 38 until the pressure level becomes so high that an override relief valve (not shown) associated with the tractor is either actuated or the operator intentionally shifts the selector valve 50 back to neutral. When that circumstance occurs, overcharging of the system may cause the fluid line 54 to expand, thereby permitting the rod 34a of slave 34 to be retracted slightly further than the rod 32a of master 32, causing a height of depth variation between the frame portions of the implement associated with the master 32 and the slave 34. Of course, such additional retraction of the slave 34 permits the slaves 36 and 38 to be retracted by the same amount, plus additional amounts as a result of conditions in the circuit between the slave 34 and the slave 38. In this respect, since the line 56 can also expand, the rod 36a of slave 36 can retract slightly further than the rod 34a of slave 34, with the slave 38 tagging along in this respect. Then, because the line 58 can also expand, the rod 38a of slave 38 can be retracted even further beyond the rod 36a of slave 36. Consequently, the last slave in the series, i.e., the slave 38, can be drifted to a retracted position which is significantly beyond that of the master 32, resulting in a significant variation in tool operating depth between those associated with the master 32 and those associated with the slave 38.

Another example of problems which occur without the valve 64 arises due to leakage which might occur from time to time in and around the selector valve 50. Assuming that the implement frame has been lowered until the stop collars 62 have bottomed out, back pressure will normally remain in the fluid lines 54, 56, 58, and 60 since considerable pressure must be exerted to lift the ground wheels 24, 26, 28 and 30 off the ground as the tools 40 become inserted down into the soil. With the selector valve 50 slipped into the neutral position, such back pressure becomes trapped.

However, if the selector valve 50 should leak during operation, and this is particularly a problem if operation has been continuing for some time such that the oil is warm and less viscous, the trapped pressure may force the oil past the selector valve 50, enabling the slaves 34, 36, and 38 to extend somewhat relative to the master 32. Consequently, even though the implement started with all portions thereof at the same operating depth, as operation continued, the slaves began to extend and thereby lift their tools to a shallower depth than those controlled by the master 32.

With the valve 64, however, and due to the fact that the valve member 76 thereof is held in its closed position by the component 84 when the cylinders are at their working depths, it matters not whether the selector valve 50 has a tendency to leak, since fluid in the portion 60b of line 60 cannot move past the valve 64 and return to the reservoir 42.

Embodiment of FIG. 5

The hydraulic arrangement as illustrated in FIG. 5 is identical to that shown in FIG. 4, with the exception that in FIG. 5 provision is made for dealing satisfactorily with an additional variable which can lead to drift problems. In this respect, in the event that the system becomes subjected to substantially higher pressures during raising of the wheels 24–30 than is actually needed to lift their load, such high pressure fluid may become trapped in the circuit as the selector valve 50 is quickly shifted to neutral. Consequently, the ground wheel 28 associated with the master 32 cannot be retracted further because of the stop collar 62 bottoming out against the cylinder housing 32c. However, the other slaves 34, 36, and 38 have no such impediment to further retraction, and since the trapped pressure exceeds that which is required to lift the associated ground wheels, those cylinder units retract further, and in a progressively increasing amount as the last slave in the series is approached as explained above, so that an unacceptably large amount of depth differential can be experienced across the width of the implement.

The arrangement as illustrated in FIG. 5, however, permits any trapped excessive pressure to be relieved in the system so that the ground wheels do not tend to drift upwardly and thereby change the depth of the tools 40 associated therewith. In this respect, it will be noted that a bleed line 86 has been added between portion 60a of line 60 and line 52. A one-way relief valve 88 in line 86 prevents flow from the line 52 to the line 60 but permits flow in the opposite direction when the pressure in line portion 60a exceeds a certain predetermined level, e.g., that which is necessary to lift the ground wheels 24–30. A restricted orifice 90 is provided in the line 86 between relief valve 88 and the line portion 60a. Such orifice 90 is restricted with respect to the other lines of the circuit so that, during pressurized retraction of the cylinder units 32–38, fluid in the line 60 does not simply bypass the slave 38 and go directly to the reservoir via the relief valve 88.

In this respect, it will be noted that as pressurized fluid is pumped through the line 60 into the rod end of slave 38 so that the other units 32, 34, and 36 are likewise caused to retract, the pressure in line 60 may climb substantially beyond that which is necessary to actually lift the load of the wheels 24–30, due to high flow rates and the various restrictions which are presented by the numerous operating elements of the circuit. Even though the relief valve 88 will be open at this time, since it is set to open at that pressure necessary to lift the load of the ground wheels 24–30, the desired working pressure is maintained within the rest of the system by virtue of the restricted orifice 90.

Once the desired extent of retraction has been reached and the selector valve 50 is shifted to its neutral position trapping fluid within the cylinder units 32–38 and their associated flow lines, the relief valve 88 continues to remain open for the purpose of bleeding off such higher pressure unitl the trapped fluid drops to the actuating pressure of the relief valve 88. At that point in time the relief valve 88 closes to prevent further bleed off. Of course, during actuation of the system in a direction to extend the cylinder units 32–38 at which time high pressure appears in the line 52, the relief valve 88 is maintained closed also.

Figure 6:
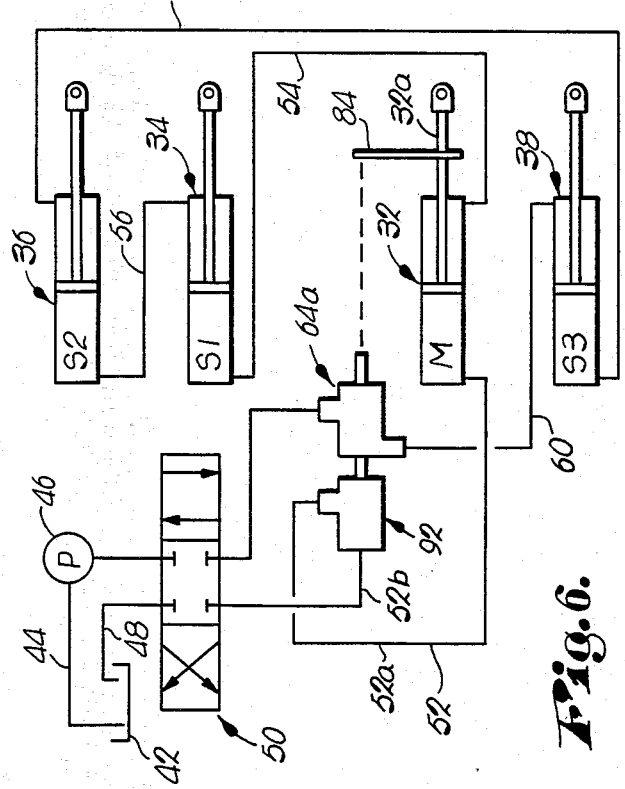
FIG. 6 is a schematic diagram illustrating a third embodiment of the present invention.

Embodiment of FIG. 6.

The arrangement of FIG. 6 is identical to that of FIG. 4, with the exception that in FIG. 6 a hydraulic means is provided for limiting further retraction of the master 32 in lieu of the mechanical stop means provided by the collars 62 in FIG. 4. In this respect, it will be noted that the line 52 leading from the selector valve 50 to the base end of the master 32 is provided with a control valve 92 which effectively divides the line 52 into a portion 52a nearest the base end of master 32 and a second portion 52b nearest the selector valve 50.

The control valve 92 may be essentially identical to the control valve 64 associated with the embodiment of FIG. 4. Such valve 92 is actuated by the component 84 so as to close the line 52 when the rod 32a of master 32 is retracted to its desired extent and, in this respect, as a matter of convenience, the valve 92 may be essentially "piggy-backed" onto the control valve associated with the slave 38 so that both such valves may be simultaneously actuated by the component 84. A slight modification to the control valve 64 will be necessary in such instance to enable the valve stems of the two valves to be coupled together, and for this reason the control valve associated with the line 60 to the slave 38 has been designated by the numeral 64a in FIG. 6, although it will be appreciated that its structure and manner of operation are identical to the valve 64 with the exception of the provision made for connection of its valve stem with the corresponding valve stem of the valve 92.

Thus, when oil is supplied to the line 52 by the pump 46 and thence to the base end of the master 32 so as to extend the cylinders 32–38, the valve 92 is hydraulically opened, as is the valve 64a, such that the cylinder units 32–38 can indeed extend.

On the other hand, when the cylinder units 32–38 have been retracted to their desired extents as determined by the adjustable position of the component 84 along the rod 32a of master 32, the valves 64a and 92 become mechanically closed by the component 84, thereby blocking the further charging of fluid into the rod ends of the cylinder units 32–38. The presence of the control valve 92 in line 52 also prevent cavitation of the master 32.

Embodiment of FIG. 7

The arrangement illustrated in FIG. 7 is identical to that of FIG. 6 with the exception that in FIG. 7 the hydraulic means for limiting retraction of the master 32 comprises a pilot-operated check valve 94 inserted in the line 52, instead of the control valve 92. In this respect, the check valve 94 permits flow through line 52 only in a direction toward the base end of master 32, except when pressure in a pilot line 96 which communicates with line portion 60b is sufficient to unseat the check valve 94 and permit retrograde flow from the base end of master 32 toward the selector valve 50.

Consequently, when the selector valve is in its extend mode so as to apply system pressure to the base end of the master 32 via line 52, the check valve 94 opens and permits such fluid supply such that the cylinder units of the series are extended.

On the other hand, when the selector valve is placed in its retract mode such that the cylinder units 32–38 are retracted, although check valve 94 would normally close, it is maintained open by virtue of the pilot line 60 which sees system pressure in the line 60 at such time as the pressurized oil is supplied to the rod ends of the cylinder units 32–38. Consequently, fluid in the line 52 from the base end of the master 32 can be exhausted to the reservoir 42.

When the control valve 64 then becomes closed by the actuating component 84, the pressure in pilot line 96 will thereafter be insufficient to unseat check valve 94 such that fluid in the base end of master 32 is trapped. This prevents further retraction of master 32 and cavitation within the system.

Embodiment of FIG. 8

The arrangement in FIG. 8 is identical to that of FIG. 7, with the exception that in FIG. 8 the control valve 64 is mechanically operated by the slave 38 instead of the master 32. In this respect, the actuating component 84 normally associated with the rod 32a of the master 32 is instead mounted on the rod 38a of the slave 38.

Thus, the operation of the arrangement in FIG. 8 is identical to the operation of the arrangement in FIG. 7, except that as the cylinder units 32–38 retract and approach the end of their selected stroke, the actuating component 84 of slave 38 engages and operates the control valve 64, rather than such actuation occuring as a result of retraction of the master 32.

Figure 9:
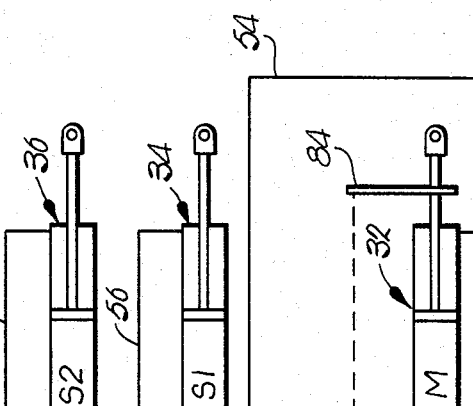
FIG. 9 is a schematic diagram of a sixth embodiment of the present invention.

Embodiment of FIG. 9

The arrangement in FIG. 9 is identical to that illustrated in FIG. 6 with the exception that in FIG. 9 provision is made for the bleed off of excessive pressure differentials as provided for in the arrangement of FIG. 5. Thus, the arrangement of FIG. 9 combines the dual control valve concept of FIG. 6 with the bleed-off provisions of FIG. 5.

In this respect, it will be noted that the line 52 between the selector valve 50 and the base end of master 32 is provided with a control valve 92a (modified for connection purposes) in the same manner as in FIG. 6, while a bleed line 86 is inserted between line 52 and line portion 60b as in FIG. 5, having the same type of relief valve 88 and restricted orifice 90.

Consequently, the master 32 is hydraulically locked by the control valve 92 against further retraction once valve 92 has been operated by the actuating component 84 associated with master 32 and, likewise, line 60 is blocked by closed valve 64 preventing the further charging of the rod end of slave 38. Excessive pressure within line 60 may be bled off via line 86 to eliminate drift which is generated from such excessive pressures.

It will be appreciated that the foregoing description has been directed to several exemplary, preferred embodiments. However, it will also be apparent that various minor modifications and improvements could be made to the disclosed embodiments by those skilled in the art without departing from the spirit and principles of the present invention.

I claim:

1. A fluid-pressure power system comprising:
   a double-acting, fluid-pressure-operated, master piston and cylinder unit;
   a master supply and return line adapted for alternately connecting said master unit with a source of pressurized fluid and a reservoir;
   at least one double-acting, fluid-pressure-operated, slave piston and cylinder unit;
   a slave supply and return line adapted for alternately connecting said slave unit with a source of pressurized fluid and a reservoir;
   a fluid line interconnecting said master unit and said slave unit in series flow relationship;
   an actuatable control valve operable when open to open said slave supply and return line and when closed to close said slave supply and return line;
   apparatus disposed for operating said control valve to close the same upon actuation of one of said units to a predetermined extent in one direction; and
   means for precluding further actuation of the master unit in said one direction upon said closing of the control valve.

2. A lift system as claimed in claim 1, wherein said actuation in one direction comprises retraction of the piston rod of said one unit relative to the cylinder thereof.

3. A lift system as claimed in claim 1 or 2, wherein said means includes structure physically isolated from fluid within said lines for mechanically limiting said actuation of the master unit in said one direction.

4. A lift system as claimed in claim 1 or 2, wherein said means includes valve structure operable to close said master supply and return line.

5. A lift system as claimed in claim 1 or 2, wherein said control valve includes a shiftable member, said apparatus including a component movable during said actuation of said one unit in one direction and operable to effect said shifting of said member.

6. A lift system as claimed in claim 5, wherein said component is attached to the piston rod of the master unit for movement therewith.

7. A lift system as claimed in claim 4, wherein said valve structure and said control valve are operably interconnected for actuation in unison.

8. A lift system as claimed in claim 7, wherein said valve structure and said control valve are provided with a common shiftable member, said apparatus including a component movable with the piston rod of said master unit and operable to effect said shifting of the member.

9. A lift system as claimed in claim 1, wherein said means includes a one-way check valve in said master supply and return line operable to close the master supply and return line in response to attempted return of fluid from the master unit through the master supply and return line when the units are idle at said predetermined extent of actuation, said check valve being provided with a pilot line disposed to open the check valve and allow return of fluid during actuation of the units in said one direction.

10. A lift system as claimed in claim 1, wherein said slave supply and return line is provided with a bleed line disposed to relieve excess fluid pressure in the slave supply and return line when the units are idle at said predetermined extent of actuation, said bleed line having a relief valve therein disposed to open the bleed line when pressure therein from the slave supply and return line exceeds a certain predetermined level, said bleed line further having flow restricter means therein between the relief valve and the slave supply and return line adapted to permit pressure in the slave supply and return line to exceed said predetermined level during actuation of the units in said one direction.

11. A lift system as claimed in claim 10, wherein said bleed line is connected between the slave supply and return line and the master supply and return line, said relief valve permitting flow only in the direction from the slave supply and return line toward the master supply and return line.

12. In a tillage implement having a frame supported by at least a pair of ground wheels which are independently connected to the frame in such a manner that the frame may be adjustably raised and lowered by varying the vertical position of the wheels relative to the frame, a fluid-pressure lift system comprising:
   a double-acting, fluid-pressure-operated, master piston and cylinder unit;
   a master supply and return line adapted for alternately connecting said master unit with a source of pressurized fluid and a reservoir;
   at least one double-acting, fluid-pressure-operated, slave piston and cylinder unit connected between the frame and the other of said wheels;
   a slave supply and return line adapted for alternately connecting said slave unit with a source of pressurized fluid and a reservoir;
   a fluid line interconnecting said master unit and said slave unit in series flow relationship;
   an actuatable control valve operable when open to open said slave supply and return line and when closed to close said slave supply and return line;
   apparatus disposed for operating said control valve to close the same upon actuation of one of said units to a predetermined extent in one direction; and means for precluding further actuation of the master unit in said one direction upon said closing of the control valve.

13. In a tillage implement as claimed in claim 12, wherein said actuation in one direction comprises retraction of the piston rod of said one unit relative to the cylinder thereof.

14. In a tillage implement as claimed in claim 12 or 13, wherein said means includes structure physically isolated from fluid within said lines for mechanically limiting said actuation of the master unit in said one direction.

15. In a tillage implement as claimed in claim 12 or 13, wherein said means includes valve structure operable to close said master supply and return line.

16. In a tillage implement as claimed in claim 12 or 13, wherein said control valve includes a shiftable member, said apparatus including a component movable during said actuation of said one unit in one direction and operable to engage and effect said shifting of said member.

17. In a tillage implement as claimed in claim 16, wherein said component is attached to the piston rod of the master unit for movement therewith.

18. In a tillage implement as claimed in claim 15, wherein said valve structure and said control valve are operably interconnected for actuation in unison.

19. In a tillage implement as claimed in claim 18, wherein said valve structure and said control valve are provided with a common shiftable member, said apparatus including a component movable with the piston rod of said master unit and operable to effect said shifting of the member.

20. In a tillage implement as claimed in claim 12, wherein said means includes a one-way check valve in said master supply and return line operable to close the master supply and return line in response to attempted return of fluid from the master unit through the master supply and return line when the units are idle at said predetermined extent of actuation, said check valve being provided with a pilot line disposed to open the check valve and allow return of fluid during actuation of the units in said one direction.

21. In a tillage implement as claimed in claim 12, wherein said slave supply and return line is provided with a bleed line disposed to relieve excess fluid pressure in the slave supply and return line when the units are idle at said predetermined extent of actuation, said bleed line having a relief valve therein disposed to open the bleed line when pressure therein from the slave supply and return line exceeds a certain predetermined level, said bleed line further having flow restricter means therein between the relief valve and the slave supply and return line adapted to permit pressure in the slave supply and return line to exceed said predetermined level during actuation of the units in said one direction.

22. A lift system as claimed in claim 21, wherein said bleed line is connected between the slave supply and return line and the master supply and return line, said relief valve permitting flow only in the direction from the slave supply and return line toward the master supply and return line.

* * * * *